United States Patent
Mao et al.

(10) Patent No.: US 10,312,788 B2
(45) Date of Patent: Jun. 4, 2019

(54) LINEAR VIBRATION MOTOR

(71) Applicants: Lubin Mao, Shenzhen (CN); Shun Guo, Shenzhen (CN)

(72) Inventors: Lubin Mao, Shenzhen (CN); Shun Guo, Shenzhen (CN)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 241 days.

(21) Appl. No.: 15/412,865

(22) Filed: Jan. 23, 2017

(65) Prior Publication Data
US 2018/0026514 A1    Jan. 25, 2018

(30) Foreign Application Priority Data

Jul. 21, 2016   (CN) .......................... 2016 1 0581151

(51) Int. Cl.
*B06B 1/04*   (2006.01)
*H02K 33/18*   (2006.01)
(Continued)

(52) U.S. Cl.
CPC ......... *H02K 41/0354* (2013.01); *B06B 1/045* (2013.01); *G08B 6/00* (2013.01);
(Continued)

(58) Field of Classification Search
CPC ........ H02K 33/00; H02K 33/02; H02K 33/18; H02K 35/04; B06B 1/045; G08B 6/00; H04R 9/00; H04R 9/02
(Continued)

(56) References Cited

U.S. PATENT DOCUMENTS 3,872,333 A * 3/1975 Imbert ..................... G21K 1/12
250/393
5,323,133 A * 6/1994 Heath ..................... G01V 1/18
335/222
(Continued)

FOREIGN PATENT DOCUMENTS

JP    2001340811 A  * 12/2001
JP    2011085682 A  *  4/2011
(Continued)

OTHER PUBLICATIONS

Terajima, Machine Translation of JP2011085682, Apr. 2011 (Year: 2011).*
(Continued)

*Primary Examiner* — Quyen P Leung
*Assistant Examiner* — Eric Johnson
(74) *Attorney, Agent, or Firm* — Na Xu; IPro, PLLC

(57) ABSTRACT

A linear vibration motor is disclosed. A linear vibration motor includes a housing with an accommodation space, a main magnetic circuit system accommodated in the housing, and a plurality of elastic components each including a first elastic component and a second elastic component separated and opposite to each other. The first elastic component and the second elastic component are electrically connected with an exterior circuit. The motor further includes a vibration module suspended by the elastic components and including a weight connected to the elastic components and a voice coil connected to the elastic components. The voice coil is disposed around the main magnetic circuit system and comprises an inlet terminal electrically connected with the first elastic component and an outlet terminal electrically connected with the second elastic component.

11 Claims, 4 Drawing Sheets

(51) Int. Cl.
  *H02K 41/035* (2006.01)
  *G08B 6/00* (2006.01)
  *H02K 5/04* (2006.01)
  *H02K 33/16* (2006.01)
  *H02K 3/52* (2006.01)
  *H02K 5/22* (2006.01)

(52) U.S. Cl.
  CPC .............. *H02K 3/521* (2013.01); *H02K 5/04* (2013.01); *H02K 5/225* (2013.01); *H02K 33/16* (2013.01)

(58) Field of Classification Search
  USPC ................ 310/12.16, 15, 17, 21, 25, 28, 29; 381/396, 412, 420, 421
  See application file for complete search history.

(56) References Cited

U.S. PATENT DOCUMENTS

| | | | | |
|---|---|---|---|---|
| 6,129,527 | A * | 10/2000 | Donahoe | F04B 35/045 417/416 |
| 6,735,322 | B1 * | 5/2004 | Watanabe | H04R 9/041 381/401 |
| 2010/0127581 | A1 * | 5/2010 | Yun | B06B 1/045 310/25 |
| 2011/0133577 | A1 * | 6/2011 | Lee | H02K 33/18 310/15 |
| 2013/0099603 | A1 * | 4/2013 | Lee | B06B 1/045 310/25 |
| 2015/0194870 | A1 * | 7/2015 | Kim | H02K 33/18 310/25 |

FOREIGN PATENT DOCUMENTS

| | | | |
|---|---|---|---|
| KR | 100898017 B1 | * | 5/2009 |
| KR | 20100024367 A | * | 3/2010 |
| KR | 20120097309 A | * | 9/2012 |

OTHER PUBLICATIONS

Song, Machine Translation of KR100898017, May 2009 (Year: 2009).*
Lee, Machine Translation of KR20120097309, Sep. 2012 (Year: 2012).*
Kweon, Machine Translation of KR20100024367, Mar. 2010 (Year: 2010).*
Odajima, Machine Translation of JP2001340811, Dec. 2001 (Year: 2001).*

* cited by examiner

LINEAR VIBRATION MOTOR

FIELD OF THE INVENTION

The invention is related to the technology of vibrators, and especially relates to a linear motor for providing tactile feedbacks.

DESCRIPTION OF RELATED ART

The portable consumer electronic products are favored by more and more people along with development of the electronic technologies, such as mobile phone, handheld game player, navigation unit or handheld multimedia entertainment equipment, etc. The vibration feedback, which is taken as one feedback form of the portable consumer electronic product, has been extended to provide the tactile feedback related to application program and scene, etc. gradually from the initial and most fundamental coming call prompt, etc. While the motor is the primary element offering vibration feedback in the mobile equipment and usually comprises a rotary motor, a piezoelectric motor, a linear motor, etc., wherein the linear motor has the absolute advantage on the aspect of offering the tactile feedback related to the application program and the scene due to its small volume, long service life, low power dissipation, rapid response, etc.

In related technologies, an inlet terminal and an outlet terminal of the voice coil in a z-axis linear vibration motor are usually connected directly with the flexible circuit board which is attached on a housing or a cover of the linear vibration motor and electrically connected with power supply outside, or the inlet terminal and the outlet terminal of the voice coil are attached directly on the housing or the cover and electrically connected with the power supply outside. In moving coil Z axis linear vibration motor structure, the displacement amplitude of the voice coil movement relative to the inlet terminal and outlet terminal is bigger, and the outlet terminal mode of the voice coil above is easy to cause the break of the outlet wire of the voice coil, thereby affecting the normal work of the linear vibration motor, with poor reliability.

Therefore, it is necessary to provide an improved linear vibration motor to overcome above disadvantage.

BRIEF DESCRIPTION OF THE DRAWINGS

Many aspects of the embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF THE EXEMPLARY EMBODIMENT

The present invention will hereinafter be described in detail with reference to an exemplary embodiment. To make the technical problems to be solved, technical solutions and beneficial effects of the present disclosure more apparent, the present disclosure is described in further detail together with the figures and the embodiment. It should be understood the specific embodiment described hereby is only to explain this disclosure, not intended to limit this disclosure.

Figure 1:
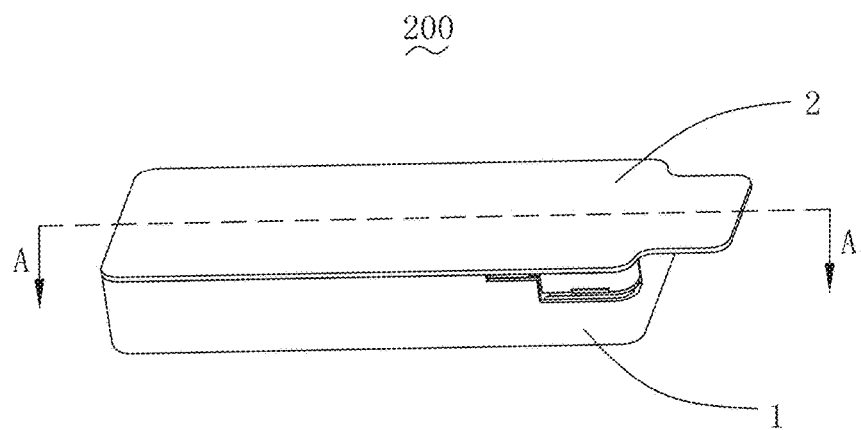
FIG. 1 is an isometric view of a linear vibration motor in accordance with an exemplary embodiment of the present disclosure.
Figure 2:
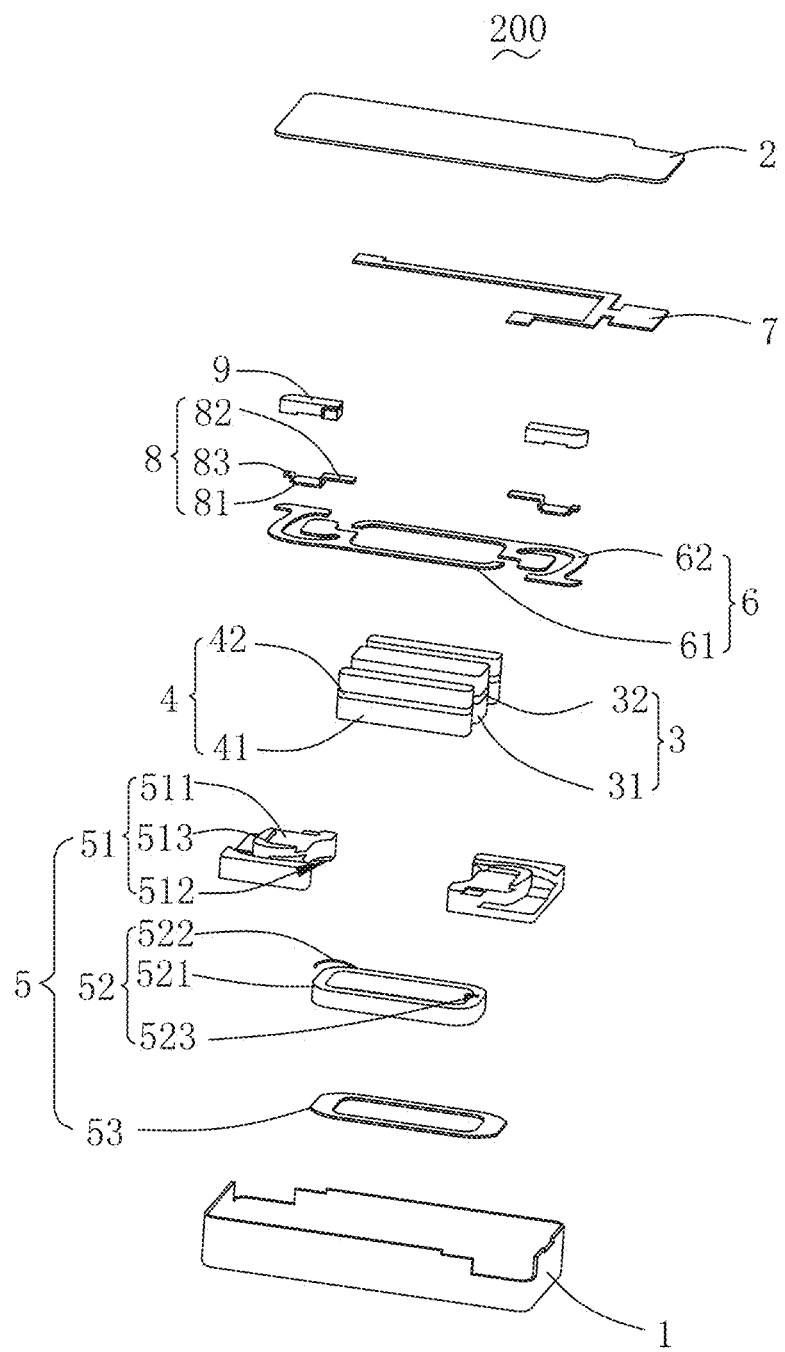
FIG. 2 is an exploded view of the linear vibration motor in FIG. 1.
Figure 3:
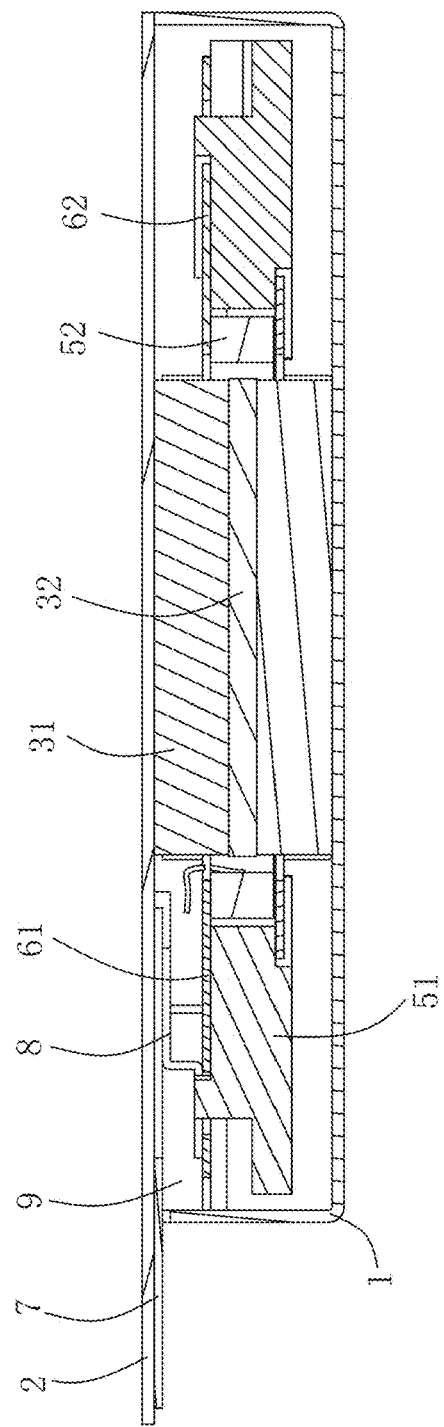
FIG. 3 is a cross-sectional view of the linear motor taken along line A-A in FIG. 1.

Referring to FIGS. 1-3, a linear vibration motor 200, in accordance with an exemplary embodiment of the present disclosure, comprises a housing 1 with an accommodation space, a cover 2 engaging with the housing 1, a main magnetic circuit 3 accommodated in the housing 1, a secondary magnetic circuit system 4, a vibration module 5 accommodated in the housing 1, elastic components 6 for suspending the vibration module 5 in the housing 1, a flexible circuit board 7 electrically connected with the power supply outside, a conductive block 8 fixed in the housing 1 for electrically connecting the flexible circuit board 7 with the power supply outside, and fixation components 9 installed inside the housing 1 and connected with the elastic components 6.

The housing 1 is a hollow rectangular structure. The cover 2 and the housing 1 form the accommodation space cooperatively.

The main magnetic circuit system 3 is used for producing magnetic field. The main magnetic circuit system 3 comprises two main magnets 31 opposite to each other, and a main pole plate 32 clamped between two main magnets 31. The same magnetic poles of the two main magnets 31 are arranged face-to-face.

The secondary magnetic circuit system 4 is used for producing magnetic field and forming stable magnetic field together with the main magnetic circuit system 3. The secondary magnetic circuit system 4 comprises four secondary magnets 41 and two secondary pole plates 42. The secondary magnets 41 are divided into two groups each including two secondary magnets with the same magnetic poles thereof facing to each other. The magnetic pole of the secondary magnet facing to another secondary magnet is different from the magnetic pole of the main magnet facing another main magnet, so the main magnetic circuit system 3 and the secondary magnetic circuit system 4 produce more powerful magnetic field, in favor of the vibration of the vibration module 5.

The vibration module 5 comprises a weight 51, a voice coil 52 driving the weight 51 to vibrate, a connecting component 53 connected with the weight 51 and the voice coil 52. The voice coil 52 is connected with the elastic component 6. One end of the elastic component 6 is fixed on the weight 51 and the other end is fixed on the housing 1. The voice coil 52 after being electrified deforms the elastic component 6 and vibrates up and down the weight 51. There are two weights 51 which are separated each other.

Each weight 51 includes a weight body 511, a slot 512 formed in the weight body 511 at the end close to the voice coil 52 and a lug 513 on the weight body 511. Two slots 512 are configured to be opposite to each other. Two terminals of the voice coil 52 are located respectively in the slots 512.

The connecting parts 53 and the voice coil 52 are connected firmly. The voice coil 52 is stacked on the connecting part 53. Both ends of the connecting part 53 are respectively connected firmly with the weight 51. The voice coil 52 is connected firmly with the weight 51 through the connecting part 53.

The voice coil 52 is installed around the main magnetic circuit system 3, specifically, the voice coil 52 is installed around the main pole plate 32. After the voice coil 52 is energized, the voice coil 52 vibrates under the action of the main magnetic circuit system 3 and the secondary magnetic circuit system 4. The voice coil 52 vibrates up and down along the main magnets 31, thus vibrates the elastic component 6 and the weight 51. The voice coil 52 comprises a voice coil body 521, an inlet terminal 522 and an outlet terminal 523 connected with the voice coil body 521. The inlet terminal 522 and the outlet terminal 523 of the voice coil 52 are connected respectively with the elastic component 6.

In this embodiment, there are two elastic components 6, which are separated each other. The elastic component 6 comprises a first elastic component 61 and a second elastic component 62. The first elastic component 61 and the second elastic component 62 are electrically connected respectively with the power supply outside. The inlet terminal 522 of the voice coil 52 is connected with the first elastic component 61 and the outlet terminal 523 of the voice coil 52 is connected with the second elastic component 62. The inlet terminal 522 and the outlet terminal 523 of the voice coil 52 are connected respectively with the first elastic component 61 and the second elastic component 62, thereby reducing the vibration amplitude of the relative movement of the inlet terminal 522 and the outlet terminal 523 when the voice coil 52 vibrates. The electric wires of the inlet terminal 522 and the outlet terminal 523 are not easy to break when the voice coil 52 vibrates, and the reliability of the linear vibration motor 200 is better.

Figure 4:
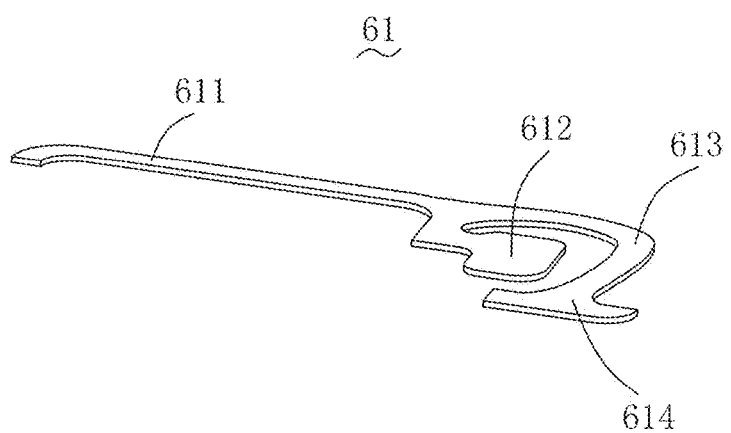
FIG. 4 is an isometric view of a first elastic component of the linear vibration motor.

Referring to FIG. 4, each of the first elastic component 61 and the second elastic component 62 includes a first fixation part 611 fixed in the voice coil 52, a second fixation part 612 extending from the first fixation part for fixing the weight 51, a deforming part 613 which extends from the first fixation part 611 for producing elastic deformation and a third fixation part 614 which extends from the deforming part 613 for being fixed in the housing 1. The deforming part 613 is installed around the second fixation part 612 and separated from the second fixation part, in which: two first fixation parts 611 are connected respectively with the inlet terminal 522 and the outlet terminal 523 of the voice coil 52. Two lugs 513 are located respectively between the second fixation part 612 and the deforming part 613.

The flexible circuit board 7 is electrically connected with the power supply outside. The flexible circuit board 7 is connected with the third fixation part 614. The elastic components 6 as the conductors are electrically connected with the voice coil 52. The elastic component 6 can be electrically connected with the power supply outside also through the electric wires electrically connected directly with the elastic component 6.

The conductive block 8 is fixed and electrically connected with the third fixation part 614. The conductive block 8 comprises a conductive block body 81, a first lug 82 and a second lug 83 extended vertically from both ends of the conductive block body 81. The first lug 82 is located at the end close to the voice coil 52 and the second lug 83 is located at the end far from the voice coil 52. The first lug 82 is connected with the flexible circuit board 7. Certainly, the conductive block 8 can be one part of the elastic component 6. The elastic component 6 can be electrically connected directly with the flexible circuit board 7.

The fixation component 9 holds down the conductive block 8 and is connected firmly with the housing 1. The conductive block 8 and the elastic component 6 are fixed on the housing 1. The conductive block 8 is electrically connected with the third fixation part 614 of the elastic component 6. The fixation component 9 is provided with a limit slot (not shown) matched with the conductive block 8. The conductive block 8 is inserted into the limit slot to restrict the conductive block 8.

Compared with the relevant technology, in the linear vibration motor disclosed in the present invention, the inlet terminal and the outlet terminal of the voice coil are electrically connected respectively with the elastic components. The voice coil is electrically connected with the power supply outside through the elastic components as conductors. When the linear vibration motor works, the displacement amplitude of the voice coil movement relative to the inlet terminal and outlet terminal is smaller. The electric wires that are connected electrically with the inlet terminal and the outlet terminal of the voice coil are not easy to be broken, thereby the reliability of the linear vibration motor is better.

It is to be understood, however, that even though numerous characteristics and advantages of the present exemplary embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A linear vibration motor comprising:
a housing with an accommodation space;
a main magnetic circuit system accommodated in the housing;
a plurality of elastic components including a first elastic component and a second elastic component separated and opposite to each other, the first elastic component and the second elastic component being electrically connected with an exterior circuit;
a vibration module suspended by the elastic components and including a weight connected to the elastic components and a voice coil connected to the elastic components; wherein
the voice coil is disposed around the main magnetic circuit system and comprises an inlet terminal electrically connected with the first elastic component and an outlet terminal electrically connected with the second elastic component; and
each of the first elastic component and the second elastic component includes a first fixation part connecting the voice coil, a second fixation part extended from the first fixation part for fixing the weight, a deforming part extended from the first fixation part for producing elastic deformation and a third fixation part extended from the deforming part for fixing to the housing; the deforming part is installed around the second fixation part and separated from the second fixation part; two first fixation parts are connected respectively with the inlet terminal and the outlet terminal of the voice coil.

2. The linear vibration motor as described in claim 1 further comprising two fixation components fixed in the housing, wherein the two third fixation parts are connected respectively with the housing through the fixation components.

3. The linear vibration motor as described in claim 2 further comprising a conductive block installed on each of the fixation component, wherein the first elastic component and the second elastic component are electrically connected with the exterior circuit through the conductive blocks.

4. The linear vibration motor as described in claim 3 further comprising a flexible circuit board located in the housing, wherein the first elastic component and the second elastic component are electrically connected with an exterior circuit through the flexible circuit board.

5. The linear vibration motor as described in claim 4, wherein each of the conductive blocks comprises a conductive block body, a first lug, and a second lug extending vertically from both ends of the conductive block body; the first lug is located at the end close to the voice coil and the second lug is located at the end far from the voice coil; the first lug is connected with the flexible circuit board.

6. The linear vibration motor as described in claim 1 comprising two weights each including a weight body, a slot located at the weight body at an end close to the voice coil, and a lug located on the weight body, wherein the two slots of the respective two weights are arranged opposite to each other, two ends of the voice coil are located respectively in the two slots, and the lugs are located respectively between the second fixation part and the deforming part.

7. The linear vibration motor as described in claim 1, wherein the main magnetic circuit system comprises two main magnets with the same magnetic poles thereof facing to each other.

8. The linear vibration motor as described in claim 7, wherein a first pole plate is sandwiched by the two first magnets.

9. The linear vibration motor as described in claim 7 further comprising a secondary magnetic circuit system located on both sides of the main magnetic circuit system, wherein the secondary magnetic circuit system comprises four secondary magnets divided into two groups each including two secondary magnets with the same magnetic poles thereof facing to each other, and further, the magnetic pole of the secondary magnet facing to another secondary magnet is different from the magnetic pole of the main magnet facing another main magnet.

10. The linear vibration motor as described in claim 7 further comprising a second pole plate sandwiched by the two secondary magnets of one group.

11. The linear vibration motor as described in claim 1 further comprising a connecting part fixed with the voice coil through which the voice coil is connected with the weight.

* * * * *